United States Patent [19]
Pomerville et al.

[11] Patent Number: 5,297,920
[45] Date of Patent: Mar. 29, 1994

[54] APPARATUS AND METHOD FOR REMOVING BALLAST STONES FROM A ROOF

[75] Inventors: Thomas E. Pomerville, Midland; Mathew J. Pacek, St. Charles; Joseph E. Kauffman, Hemlock, all of Mich.

[73] Assignee: Magnum Construction Company, Inc., Midland, Mich.

[21] Appl. No.: 28,554

[22] Filed: Mar. 8, 1993

[51] Int. Cl.⁵ ........................................... B65G 67/08
[52] U.S. Cl. .................... 414/376; 414/340; 414/397; 414/398; 414/574; 414/786
[58] Field of Search ........... 414/376, 786, 10, 340, 414/572-574, 389, 390, 397, 398; 198/550.1, 550.01, 550.12, 550.13, 550.2, 311

[56] References Cited
U.S. PATENT DOCUMENTS

| | | | |
|---|---|---|---|
| 242,694 | 6/1881 | Reynolds et al. | 414/397 |
| 510,225 | 12/1893 | Young | 414/574 X |
| 1,001,212 | 8/1911 | Moore | 198/311 X |
| 1,494,223 | 5/1924 | Dussault | 198/311 |
| 3,606,050 | 9/1971 | Silver | 414/574 |
| 3,802,584 | 4/1974 | Sackett, Sr. et al. | 414/376 |
| 4,813,839 | 3/1989 | Compton | 198/311 X |

Primary Examiner—David A. Bucci
Attorney, Agent, or Firm—Barnes, Kisselle, Raisch, Choate, Whittemore & Hulbert

[57] ABSTRACT

A conveyor system comprising a platform positioned above and spaced from a building roof for receiving a motorized or manual stone ballast transport cart, and a conveyor positioned beneath the platform for receiving ballast stones unloaded from the cart and conveying the stones over the edge of the roof. The platform is essentially flat and parallel to the roof and includes two ramps positioned at opposite ends of the platform, an opening located directly above the conveyor for permitting passage of ballast stones from the cart to the conveyor, and a grate in the opening with through openings in the grate large enough to permit passage of ballast stones and small enough so that the grate provides a path for the removal machine over the opening. The conveyor is an endless belt conveyor and is driven by a drive belt connected to an internal combustion engine. A chute is disposed at the end of the conveyor overhanging the edge of the building roof to receive the ballast stones from the conveyor and direct the ballast stones to an awaiting truck or receptacle at ground level.

22 Claims, 3 Drawing Sheets

APPARATUS AND METHOD FOR REMOVING BALLAST STONES FROM A ROOF

FIELD OF THE INVENTION

This invention relates to building roof construction, and more particularly to removing an existing layer of stone ballast from a building roof.

BACKGROUND OF THE INVENTION

It is common for commercial building roofs to be covered by a layer of stone ballast. When the roof must be repaired or replaced, the ballast stones must first be removed. Conventionally, motorized or manual gravel carts (e.g. wheelbarrows) are used transport up the ballast stones on the roof surface and dump the stones at the perimeter of the roof. One or more workers must then stand at the edge of the building and shovel the stones into a chute that directs the stones into a waiting truck at ground level. This method of removing the ballast stones has several disadvantages. The workers standing at the edge of the building roof are in constant danger of falling off of the roof, the manpower necessary to shovel the ballast stones into the chute increases the cost of the roof replacement or repair, and a risk of personal injury or property damage below exists if the stones are not shoveled directly into the chute but instead over the building edge.

SUMMARY OF THE INVENTION

Accordingly, it is an object of the present invention to eliminate the necessity of dumping ballast stones at the perimeter of the building roof and having workers manually shovel the ballast stones into a chute.

It is another object of the present invention to reduce the danger to workers of falling off the edge of the building roof.

A further object of the present invention is to reduce the cost of replacement or repair of a building roof by eliminating the need for additional workers standing at the edge of the building shoveling stones into a chute.

A still further object of the present invention is to eliminate the danger of injuring persons or damaging property at ground level by directing the ballast stones into a chute by removing the risk of additional manpower error.

The present invention accomplishes the intended objectives by providing a conveyor system comprising a platform positioned above and spaced from the roof for receiving a motorized or manual cart, and a conveyor positioned beneath the platform for receiving ballast stones unloaded from the cart and conveying the stones over the edge of the roof.

In the preferred embodiment, the platform is essentially flat and parallel to the roof and includes two ramps positioned at opposite ends of the platform, an opening located directly above the conveyor for permitting passage of ballast stones from the motorized or manual cart to the conveyor, and a grate in the opening with through openings in the grate large enough to permit passage of ballast stones and small enough so that the grate provides a path for the gravel cart over the opening. The conveyor in the preferred embodiment is an endless belt conveyor and is driven by a drive belt connected to an internal combustion engine. A chute is disposed at the end of the conveyor overhanging the edge of the building roof to receive the ballast stones from the conveyor and direct the ballast stones to an awaiting truck or receptacle at ground level. In the preferred embodiment, a motorized or manual cart is used to transport ballast stones over the building roof surface. The cart is maneuvered up one of the ramps onto the platform until the cart is positioned directly over the opening in the platform. The recovered ballast stones are then unloaded from the cart onto the conveyor beneath the platform and then conveyed over the edge of the building roof into the chute.

These and other features, objects and advantages of the invention will become apparent from the following detailed description and accompanying drawings.

DETAILED DESCRIPTION OF THE PREFERRED EMBODIMENT

Figure 1:
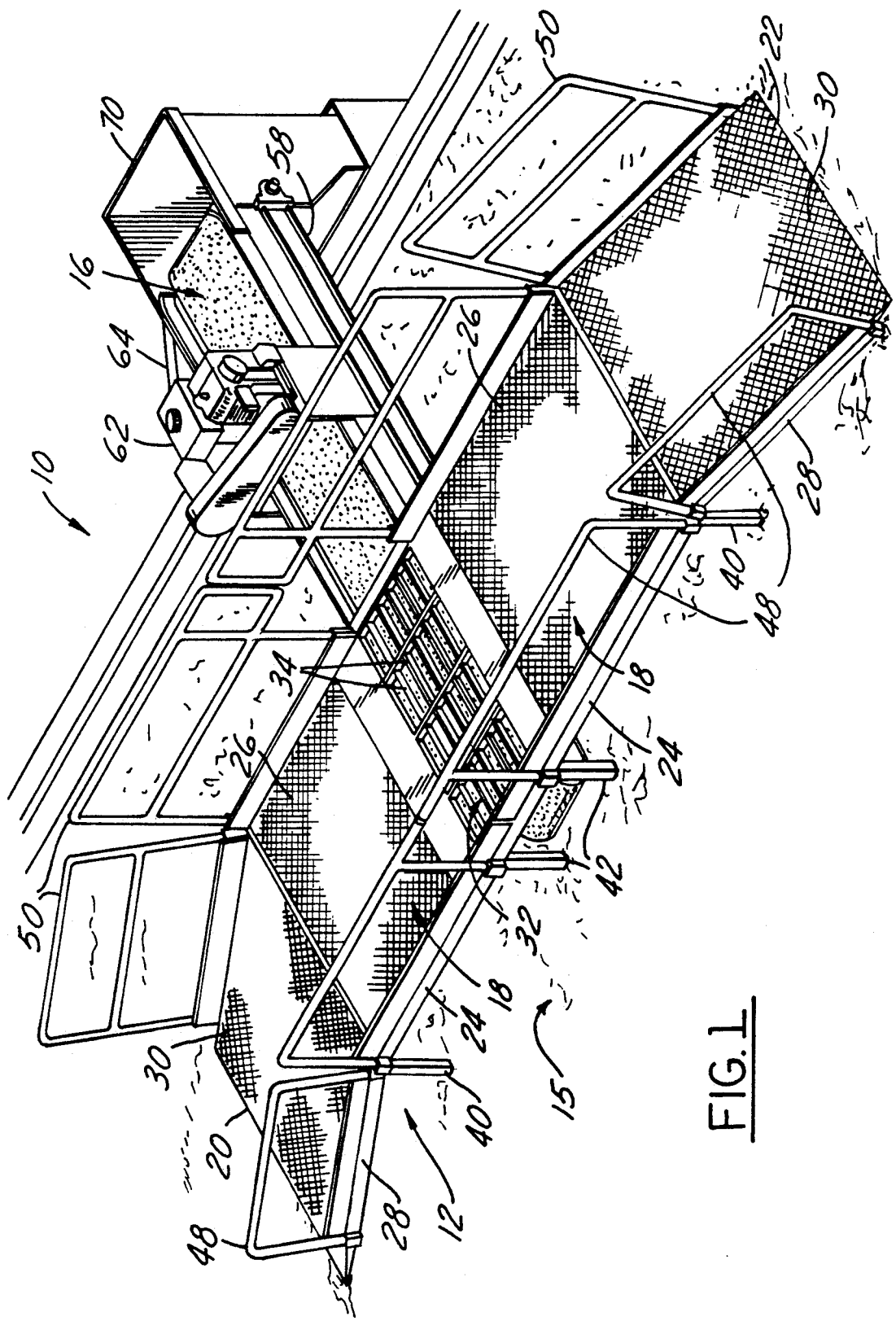
FIG. 1 is an elevational perspective view of a conveyor system according to the invention.

Referring now to the drawings, there is shown in FIG. 1 a conveyor system 10 according to a presently preferred embodiment of the invention. The conveyor system 10 includes a platform 12 above and spaced from the building roof 15 and a conveyor 16 positioned beneath platform 12. In the preferred embodiment, platform 12 is comprised of a flat section 18, above, spaced from and parallel to roof 15, and two ramps 20, 22 positioned at opposite ends of the flat section. Flat section 18 is essentially rectangular and ramps 20, 22 are attached in abutting relation to the two short sides of the rectangular flat section.

Figure 5:
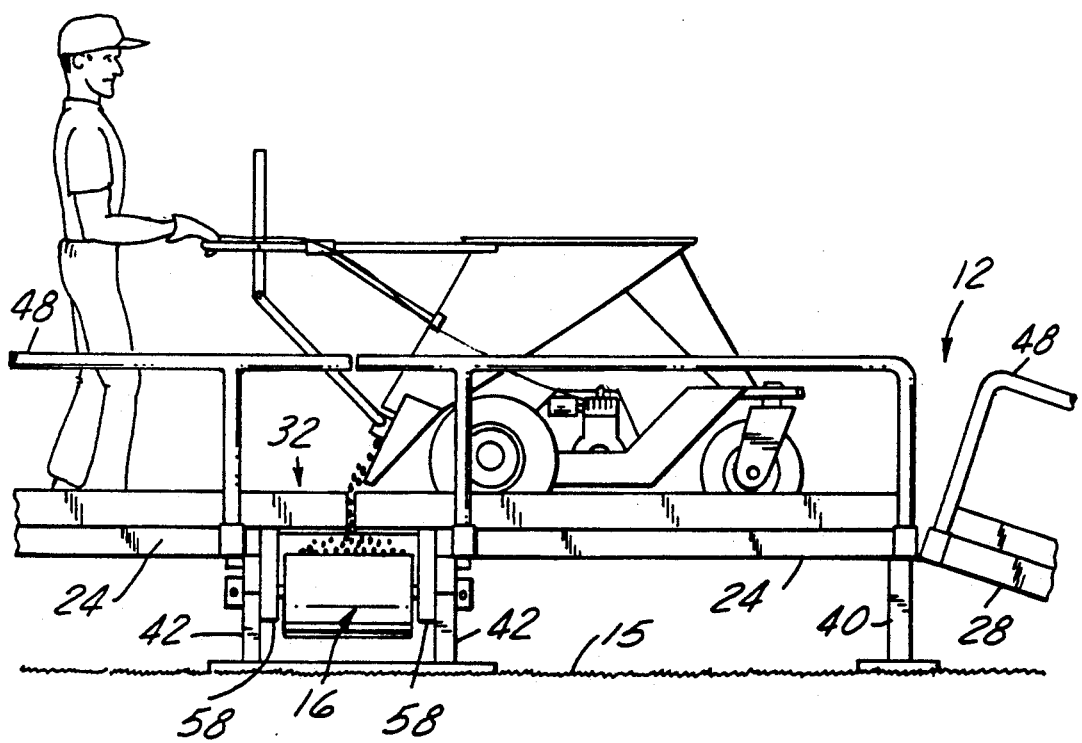
FIG. 5 is a side view of the conveyor and part of the platform, as shown in FIG. 1, including a motorized gravel cart.

The perimeter of flat section 18 is constructed of a rigid frame 24 of suitable material such as channel or I-beam steel. The surface 26 of flat section 18 is constructed of a suitable sheet of rigid material such as expanded metal and attached to the top of rigid frame 24. A rectangular opening 32 is located in platform 12 bisecting flat section 18 and transverse thereto. Opening 32 is essentially the same width as conveyor 16 beneath platform 12 and is essentially parallel to conveyor 16. Opening 32 is for receiving the ballast stones unloaded from a gravel cart, as shown in FIG. 5. A grate 34 is placed in opening 32 to provide a path over the opening for the cart. Grate 34 has rectangular through openings 36 large enough to receive and pass the ballast stones, and yet small enough so that the cart can pass over opening 32.

Four legs 40 depend from rigid frame 24 and are positioned one at each corner of rectangular flat section 18. Four legs 42 are located on the long sides of rectangular flat section 18, two on each side, spaced apart about the same width as opening 32 in the flat section. As will be described below, legs 42 located on the sides of the flat section 18 support one end of conveyor 16 as well as the center portion of the flat section. All eight legs 40, 42 are of essentially the same length and position platform 12 above and spaced from roof 15.

Ramps 20, 22 positioned at the short sides of platform 12 are essentially the same width as flat section 18. Each ramp 20, 22 is of construction similar to flat section 18 in that the outer perimeter of each ramp 20, 22 has a rigid frame structure 28, and the surface 30 of each ramp 20, 22 is constructed of a suitable sheet of rigid material such as expanded metal and attached to the top surface of frame structure 28. One end of each ramp 20, 22 is attached in abutting relation to a short side of rectangular flat section 18 and the other end of each ramp rests on roof 15, thereby providing ramp access to and exit from flat section 18 for the removal machine.

In the preferred embodiment, safety side rails 48, 50 extend vertically upward from each of the long sides of platform 12. Both safety side rails 48, 50 are of sufficient height to prevent the removal machine from falling off either side of the platform. Safety rail 50 on the side of platform 12 nearest the edge of roof 15 is of sufficient height to prevent a person from falling off the edge of the platform, thereby preventing the person from also falling off the edge of the roof. Safety side rails 48, 50 may be constructed of a suitably rigid material such as tubular steel.

Figure 3:
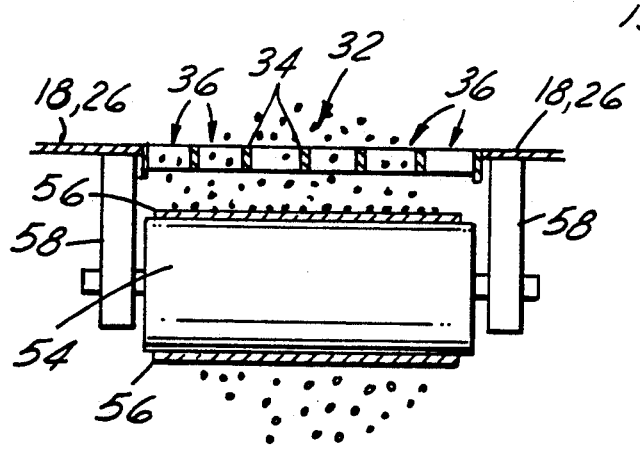
FIG. 3 is a sectional view taken through line 3—3 in FIG. 4.

Conveyor 16 is located beneath and transverse to platform 12 directly under and parallel to opening 32 in flat section 18 of the platform. Conveyor 16 runs under the entire width of the platform 12, with one end extending to and overhanging the edge of roof 15. The width of conveyor 16 in the preferred embodiment is about that of opening 32 so as to receive any ballast stones being unloaded from the motorized cart located on the platform, as shown in FIG. 3. Conveyor 16 in the preferred embodiment is of the continuous or endless belt type which includes a drive pulley 52, a take-up pulley 54, an endless belt 56, and a frame support 58, and, if necessary, idlers to provide support for belt 56 between pulleys 52, 54.

Figure 4:
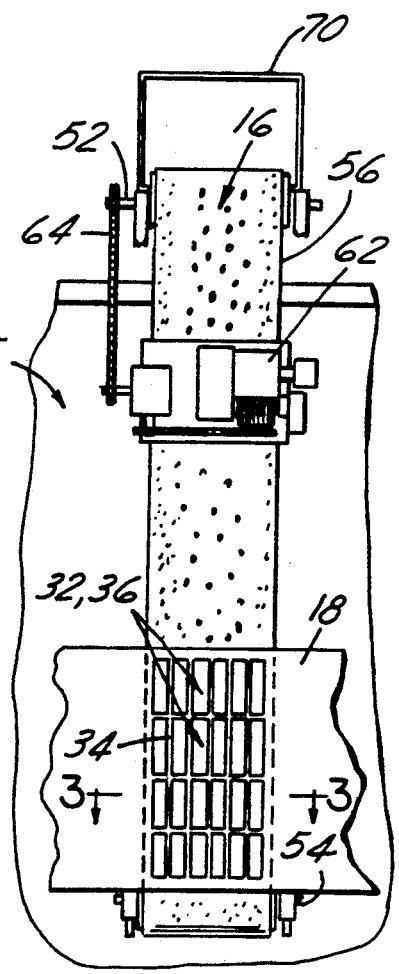
FIG. 4 is a plan view of the conveyor and a portion of the platform, as shown in FIG. 1.

Frame support 58, as shown in FIG. 1, includes two rigid beams, such as steel channels, affixed to legs 42 beneath and transverse to platform 12. Each beam is fixedly mounted to two of the legs 42, one leg 42 on each side of platform 12, so that the beams are essentially parallel to each other and spaced the same distance apart as legs 42 on each side of platform 12. Drive pulley 52 is mounted between and transverse to the two beams at the end of frame support 58, overhanging the edge of roof 15, as shown in FIG. 4. Take-up pulley 54 is mounted between and transverse to the two beams at the end of frame support 58 beneath platform 12, as shown in FIGS. 3 and 4. To eliminate any need for an external power source for driving conveyor 16 in the preferred embodiment, the drive for conveyor 16 takes the form of an internal combustion engine 62, which runs on a petroleum fuel such as gasoline. A drive belt 64 connected to an output shaft of engine 62 is connected to drive pulley 52 of conveyor 16, which in turn drives the conveyor.

Figure 2:
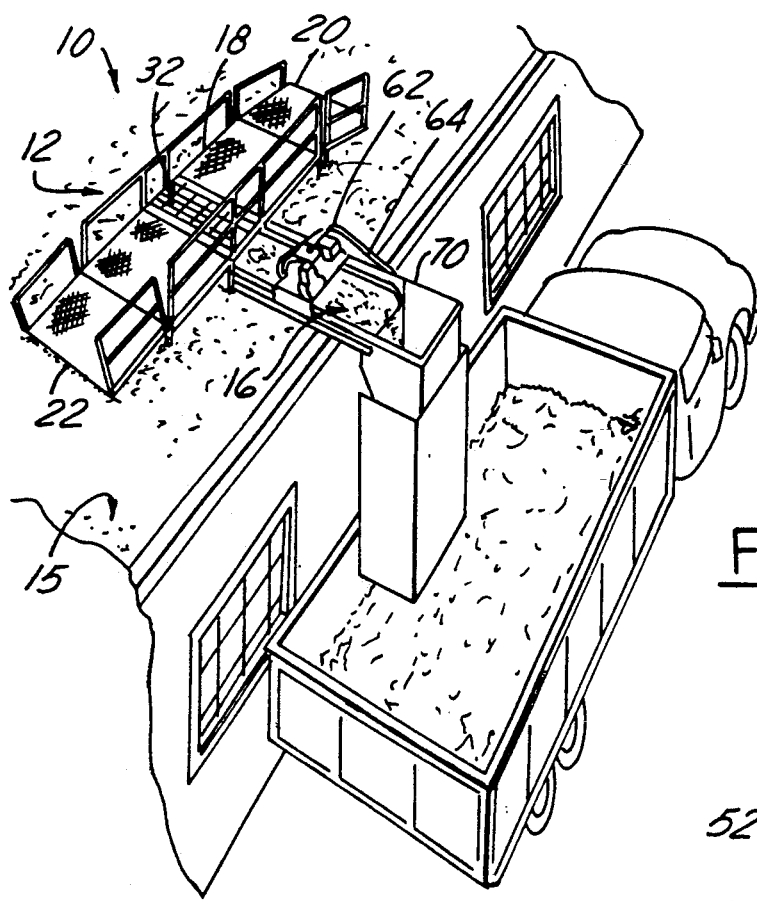
FIG. 2 is an elevational view of the conveyor system, as shown in FIG. 1, in use on the roof of a building.

At the end of conveyor 16 overhanging the edge of roof 15 is disposed a chute 70 for receiving the ballast stones on conveyor 16 and for directing the ballast stones to a waiting truck or receptacle at ground level, as shown in FIG. 2. Chute 70 should be of an enclosed construction so as to prevent ballast stones from falling directly to the ground and missing the truck or receptacle. Chute 70, however, may be an open slide or conveyor type construction and accomplish its intended purpose of receiving and directing the ballast stones to ground level.

A stone ballast removal machine is typically utilized for picking up the ballast stones directly from roof 15. A gravel cart is used to carry the ballast stones to conveyor system 10 of the preferred embodiment. Roof ballast stones are typically in the size range of 0.75 to 1.5 inches. One commercially available motorized gravel cart (as illustrated in FIG. 5) is the "Ballastmaster" machine available from Aeroil, Inc. The cart is directed from the roof 15 up either ramp 20, 22 of platform 12 and maneuvered so that the hopper of the removal machine is directly over opening 32 in flat section 18, as shown in FIG. 5. The operator unloads the ballast stones from the hopper through grate 34 in opening 32 and onto conveyor 16 where the ballast stones are then conveyed to the edge of the building and into chute 70, wherefrom the ballast stones are then directed to the truck or receptacle at ground level. The operator then maneuvers the removal machine ahead and down the other ramp 22, 20 back onto roof 15 wherefrom more ballast stones may be removed and the operation may be repeated until the ballast stones are satisfactorily removed from the roof surface.

The foregoing preferred embodiment has been described for purposes of illustrating the spirit and principles of the invention. This embodiment is susceptible to modifications and variations without departing from the spirit and scope of this invention. For example, the platform need not be rectangular but may be constructed in the form of a square or may be circular or some other suitable shape. The platform may be constructed from materials other than steel or other suitable steel materials. The platform frame may be constructed of tubular steel or any other sufficiently rigid and structurally strong material. The means for accessing and exiting the platform flat section may be one ramp or some mechanical means for lifting a removal machine onto and off of the platform flat section. The conveyor need not be directly beneath any portion of the platform but may be positioned at an edge of the platform at a level beneath the surface of the platform flat section. The ballast stones would then be unloaded from the removal machine hopper over an edge of the platform onto the conveyor and not through a grate or opening located somewhere in the platform flat section. The conveyor may be a spiral or screw type conveyor or other suitable type. The power source for driving the conveyor could be an electric motor or some other power source. The driving connection between the power source and the conveyor itself could be a direct drive or chain drive system or some other suitable drive mechanism. Accordingly, this invention includes all embodiments limited only by the spirit and scope of the following claims.

We claim:

1. A conveyor system for removing ballast stones from a building roof that comprises:
    a platform including means for positioning said platform above and spaced from the building roof, and means for receiving a ballast transport cart onto said platform, and
    a conveyor positioned beneath said platform for receiving ballast stones unloaded from the cart on said platform and conveying the stones over an edge of the building roof.

2. A conveyor system as set forth in claim 1 wherein said platform is essentially flat and parallel to the building roof.

3. A conveyor system as set forth in claim 1 wherein said means for receiving the cart includes at least one ramp extending from the building roof to said platform.

4. A conveyor system as set forth in claim 3 wherein said platform includes a safety side rail extending vertically upward from at least a side of said ramp and said platform nearest the edge of the building roof.

5. A conveyor system as set forth in claim 4 wherein said platform includes a safety side rail extending vertically upward from both sides of said ramp and said platform.

6. A conveyor system as set forth in claim 3 wherein said means for receiving the cart includes two ramps extending from the building roof to said platform.

7. A conveyor system set forth in claim 6 wherein said ramps are positioned at opposite ends of said platform.

8. A conveyor system as set forth in claim 6 wherein said platform includes an opening located directly above said conveyor for permitting passage of ballast stones from the cart to said conveyor.

9. A conveyor system as set forth in claim 8 wherein said platform includes a grate in said opening with openings in said grate large enough to permit passage of ballast stones and small enough so that said grate provides a path for the cart over said opening.

10. A conveyor system as set forth in claim 1 wherein said platform includes an opening located directly above said conveyor for permitting passage of ballast stones from the cart to said conveyor.

11. A conveyor system as set forth in claim 10 wherein said platform includes a grate in said opening with openings in said grate large enough to receive ballast stones and small enough so that said grate provides a path for the cart over said opening.

12. A conveyor system as set forth in claim 1 wherein said conveyor is an endless conveyor.

13. A conveyor system as set forth in claim 12 wherein said endless conveyor is a belt conveyor.

14. A conveyor system as set forth in claim 13 wherein said belt conveyor is driven by an internal combustion engine.

15. A conveyor system as set forth in claim 14 wherein said internal combustion engine drives said belt conveyor by a drive belt.

16. A conveyor system as set forth in claim 1 wherein said conveyor is driven by an internal combustion engine.

17. A conveyor system as set forth in claim 16 wherein said internal combustion engine drives said conveyor by a drive belt.

18. A conveyor system as set forth in claim 1 wherein said conveyor includes a chute disposed at the edge of the building roof to receive the ballast stones from said conveyor and direct the ballast stones to ground level.

19. A conveyor system for removing ballast stones from a building roof that comprises:

a platform essentially flat and parallel to the building roof which includes means for positioning said platform above and spaced from the building roof, two ramps for receiving a stone ballast transport cart onto said platform, an opening for permitting passage of the ballast stones from the cart, and a grate in said opening with openings in said grate large enough to permit passage of the ballast stones and small enough to provide a path for the cart over said opening, and a continuous belt conveyor positioned beneath said platform, directly under said opening, for receiving the ballast stones unloaded from the cart on said platform and conveying the stones over an edge of the building roof.

20. A conveyor system as set forth in claim 19 wherein said ramps are positioned at opposite ends of said platform.

21. A conveyor system as set forth in claim 19 wherein said conveyor includes a chute disposed at an edge of the building roof to receive the ballast stones from said conveyor and direct the ballast stones to ground level.

22. A method for removing ballast stones from a building roof that comprises:

a. recovering ballast stones from a building roof using a stone ballast transport cart, b. maneuvering the cart onto a platform supported above the building roof, c. unloading the recovered ballast stones from the cart onto a conveyor beneath said platform, and d. conveying the ballast stones on said conveyor over an edge of the building roof.

* * * * *